United States Patent
Smith et al.

(10) Patent No.: US 11,097,836 B2
(45) Date of Patent: Aug. 24, 2021

(54) VIBRATION ATTENUATION SYSTEM FOR ELECTRIC AND HYBRID ELECTRIC VEHICLES

(71) Applicant: Bell Helicopter Textron Inc., Fort Worth, TX (US)

(72) Inventors: Michael Reaugh Smith, Colleyville, TX (US); Jouyoung Jason Choi, Southlake, TX (US); Joseph Richard Carpenter, Kennedale, TX (US); Steve Michael Loveland, Fort Worth, TX (US)

(73) Assignee: Textron Innovations Inc., Fort Worth, TX (US)

( * ) Notice: Subject to any disclaimer, the term of this patent is extended or adjusted under 35 U.S.C. 154(b) by 307 days.

(21) Appl. No.: 16/360,803

(22) Filed: Mar. 21, 2019

(65) Prior Publication Data

US 2020/0298967 A1    Sep. 24, 2020

(51) Int. Cl.
*B64C 27/00* (2006.01)

(52) U.S. Cl.
CPC ...... *B64C 27/001* (2013.01); *B64C 2027/002* (2013.01); *B64C 2027/005* (2013.01)

(58) Field of Classification Search
CPC ........ B64C 2027/005; B64C 2201/042; B64C 27/001
See application file for complete search history.

(56) References Cited

U.S. PATENT DOCUMENTS

| | | | | |
|---|---|---|---|---|
| 3,845,917 | A * | 11/1974 | Drees ................. | B64C 27/001 244/17.27 |
| 4,042,070 | A * | 8/1977 | Flannelly ............ | B64C 27/001 188/379 |
| 6,286,782 | B1 * | 9/2001 | Bansemir ........... | B64C 27/001 188/379 |
| 7,461,729 | B2 * | 12/2008 | Manfredotti ........ | B64C 27/001 188/379 |

(Continued)

FOREIGN PATENT DOCUMENTS

WO    2015161517 A1    10/2015

OTHER PUBLICATIONS

EPO Examination Report issued in EP Patent Application No. 20154974.8 dated Aug. 25, 2020, 7 pages.

(Continued)

*Primary Examiner* — Brian M O'Hara
(74) *Attorney, Agent, or Firm* — Patent Capital Group

(57) ABSTRACT

In some examples, an aircraft comprises an airframe, a rotor system coupled to the airframe, and a vibration attenuation system. The rotor system is operable to exert a vibratory force on the airframe. The vibration attenuation system comprises two or more batteries and elastic devices. The two or more batteries are operable to supply power to the rotor system. The elastic devices coupled to the two or more batteries and the airframe. The elastic devices are configured to attenuate the vibratory force based on facilitating oscillation of the two or more batteries. In other examples, a method comprises coupling elastic devices to two or more (Continued)

batteries and an airframe of an aircraft. The elastic devices receiving a vibratory force via the airframe and attenuate the vibratory force based on facilitating oscillation of the two or more batteries.

18 Claims, 14 Drawing Sheets

(56) References Cited

U.S. PATENT DOCUMENTS

| | | | |
|---|---|---|---|
| 8,474,745 B2 | 7/2013 | Popelka et al. | |
| 8,746,649 B2 | 6/2014 | Haynes et al. | |
| 9,194,285 B2 * | 11/2015 | Botti | B64C 27/14 |
| 9,592,909 B2 * | 3/2017 | Cranga | B64C 27/001 |
| 10,193,370 B1 * | 1/2019 | Schweitzer | B64C 39/024 |

OTHER PUBLICATIONS

EPO Search Report issued in EP Patent Application No. 20154974.8 dated Aug. 13, 2020, 4 pages.

EPO Examination Report issued in EP Patent Application No. 20154974.8 dated Apr. 12, 2021, 6 pages.

* cited by examiner

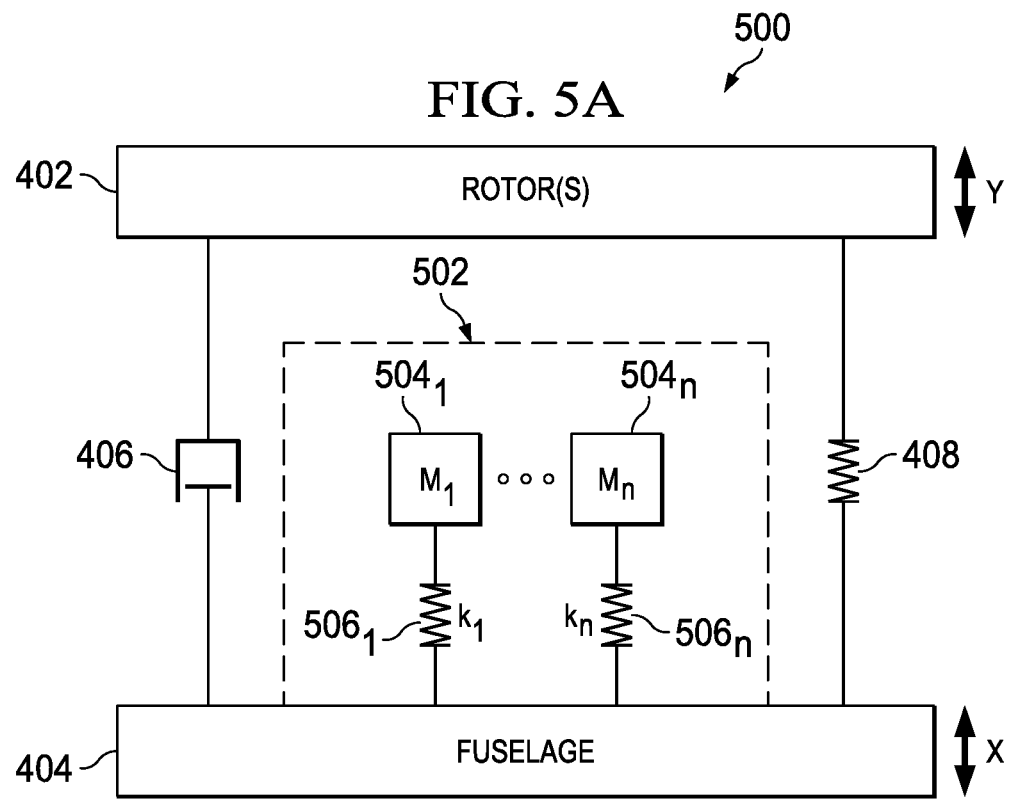
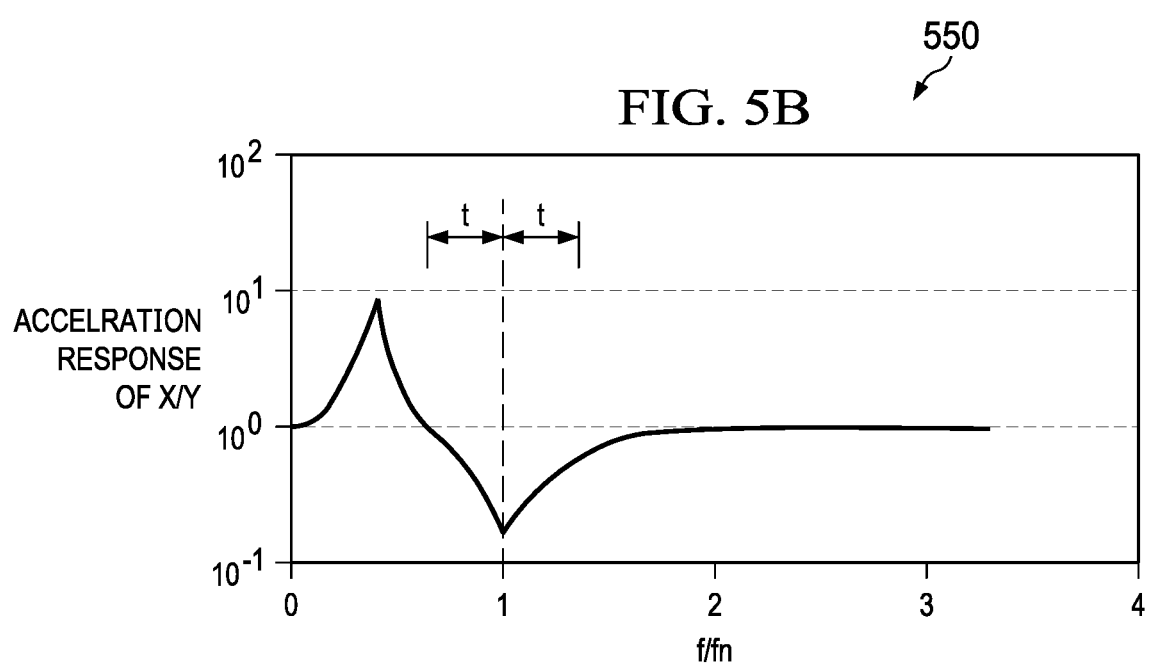

VIBRATION ATTENUATION SYSTEM FOR ELECTRIC AND HYBRID ELECTRIC VEHICLES

TECHNICAL FIELD

This disclosure relates generally to aircraft drive systems, and more particularly, though not exclusively, to systems and apparatuses for attenuating vibrations.

BACKGROUND

Aircraft include mechanical components that produce vibrations during operation. In addition, when airborne, airflow around various parts can induce further vibrations that may exacerbate the vibrations from the mechanical components. While tuned mass absorbers or Frahms may help to mitigate such vibrations they are generally heavy and add more weight to an aircraft.

SUMMARY

In some examples, an aircraft comprises an airframe, a rotor system coupled to the airframe, and a vibration attenuation system. The rotor system is operable to exert a vibratory force on the airframe. The vibration attenuation system comprises two or more batteries and elastic devices. The two or more batteries are operable to supply power to the rotor system. The elastic devices coupled to the two or more batteries and the airframe. The elastic devices are configured to attenuate the vibratory force based on facilitating oscillation of the two or more batteries.

In other examples, a vibration attenuation system comprises two or more batteries and elastic devices. The two or more batteries are operable to supply power to a rotor system of an aircraft. The elastic devices coupled to two or more batteries and an airframe of the aircraft. The elastic devices are configured attenuate a vibratory force of the airframe based on facilitating oscillation of the two or more batteries.

In still other examples, a method comprises coupling elastic devices to two or more batteries and an airframe of an aircraft. The elastic devices receiving a vibratory force via the airframe and attenuate the vibratory force based on facilitating oscillation of the two or more batteries.

BRIEF DESCRIPTION OF THE DRAWINGS

FIG. 5A illustrates a simplified diagram of an aircraft dynamic system with tuned masses, in accordance with some embodiments of the present disclosure.

FIG. 5B illustrates a frequency response of the aircraft dynamic system of FIG. 5A, in accordance with some embodiments of the present disclosure.

DETAILED DESCRIPTION

Figure 1A:
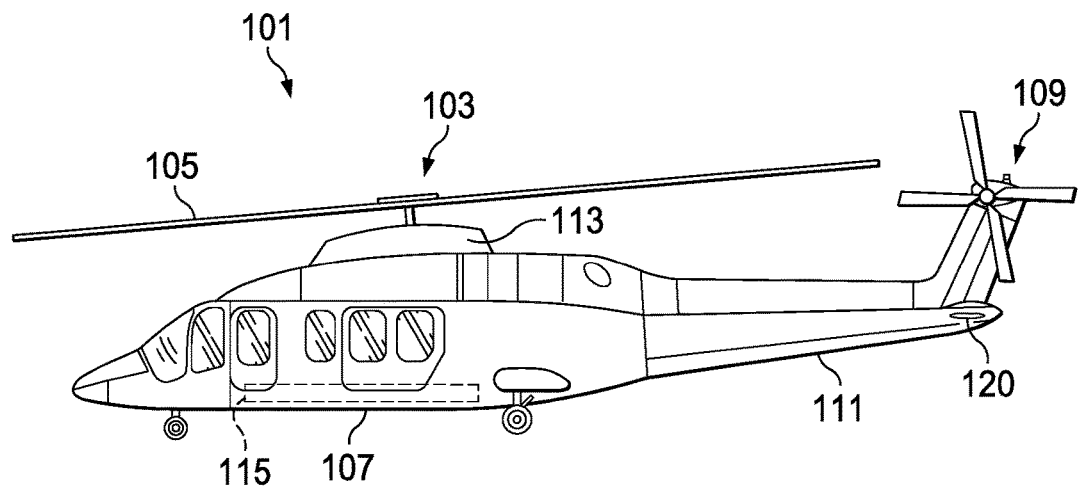
FIGS. 1A, 1B, 2A, 2B, 3A, and 3B illustrate example aircraft, in accordance with some embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiments, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
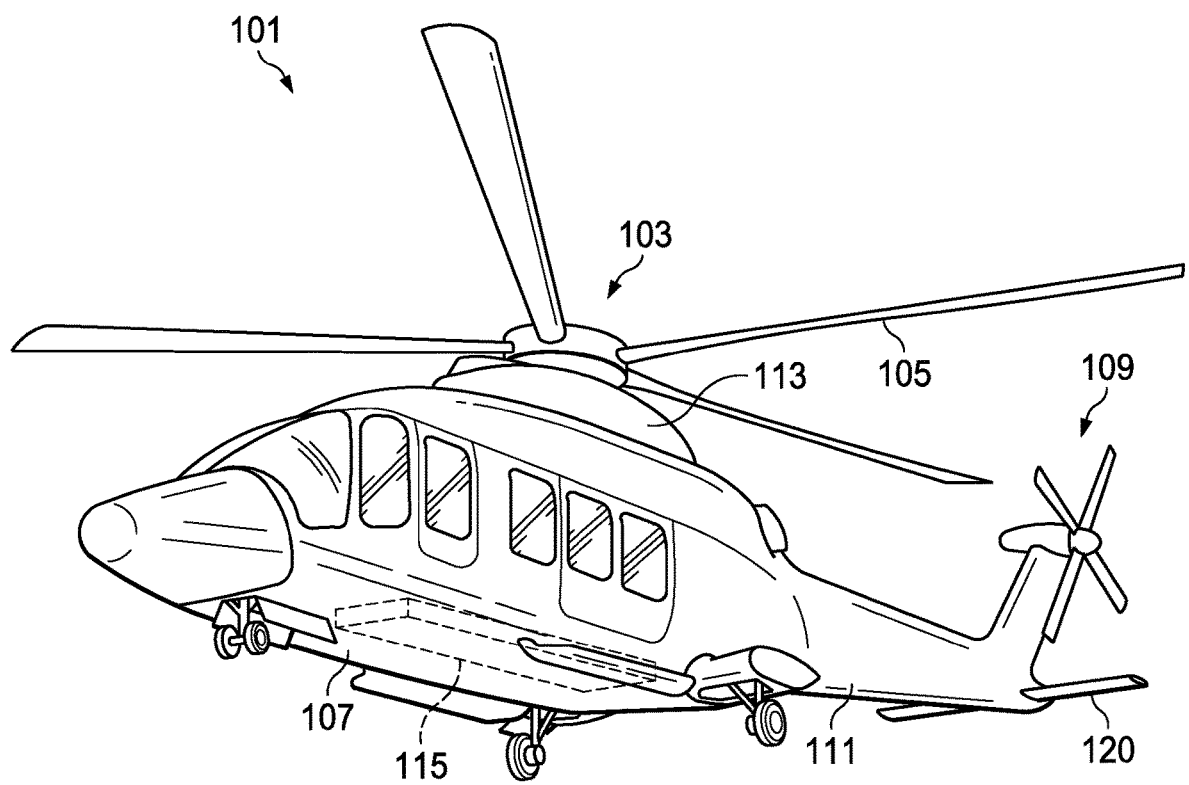

FIGS. 1A and 1B illustrate an example embodiment of a rotorcraft 101. FIG. 1A illustrates a side view of the rotorcraft 101, while FIG. 1B illustrates a perspective view of the rotorcraft 101. Rotorcraft 101 includes a rotor system 103 with a plurality of rotor blades 105. The pitch of each rotor blade 105 can be managed or adjusted in order to selectively control direction, thrust, and lift of the rotorcraft 101. Rotorcraft 101 further includes a fuselage 107, tail rotor or anti-torque system 109, an empennage 111, a tail structure 120, and a battery compartment 115. An airframe (not shown) supports the fuselage 107 and defines the battery compartment 115. The rotor system 103 is coupled to the airframe and, during operating, transmits vibrations to the airframe. The battery compartment 115 houses one or more batteries such as electric-vehicle batteries which can supply power to the rotor system 103. In the illustrated embodiment, tail structure 120 may be used as a horizontal stabilizer. Torque is supplied to rotor system 103 and anti-torque system 109 using at least one engine. The rotorcraft 101 includes a variety of fairing and/or cowling assemblies configured to cover or protect components of the rotorcraft and reduce aerodynamic drag. One example upper cowling assembly 113 is arranged above an unillustrated engine and may, at least in part, cover and protect, for example, drive-train components. Fairings and cowlings provide a relatively smooth outer surface that reduces aerodynamic drag experienced by the rotorcraft 101.

Figure 2A:
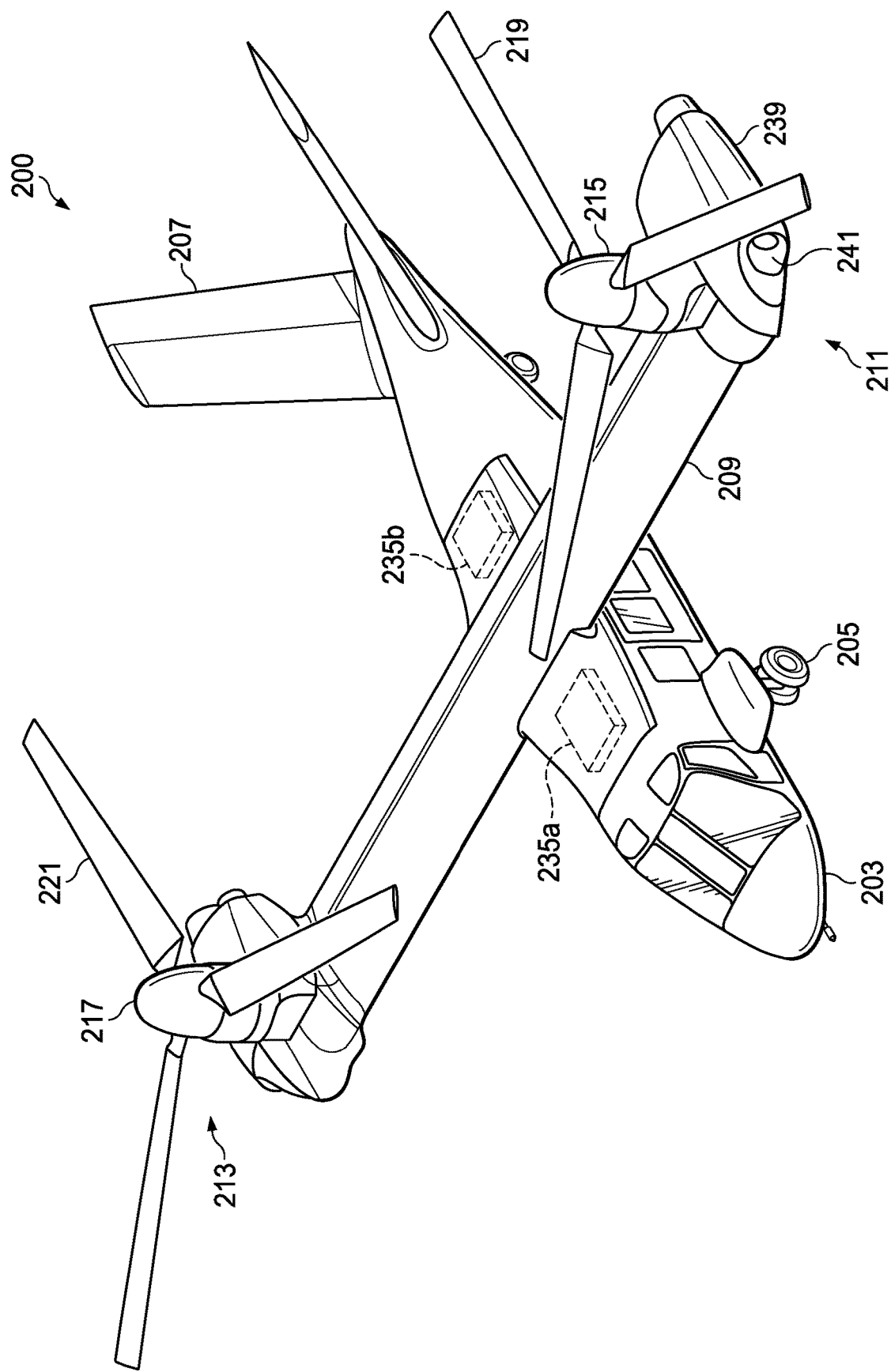
Figure 2B:
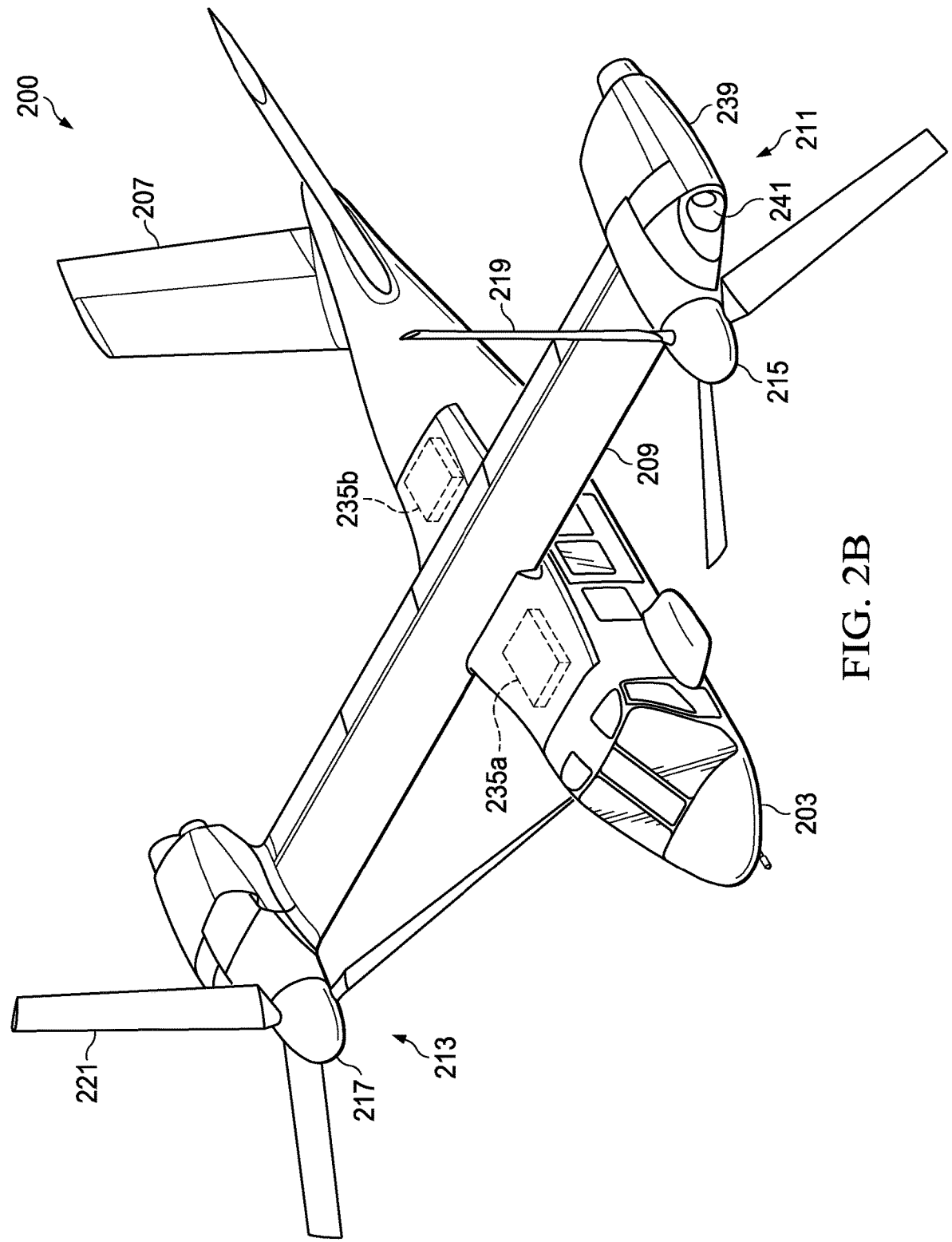

FIGS. 2A and 2B illustrate an exemplary aircraft, which in this case is a tiltrotor aircraft 200. Tiltrotor aircraft 200 can include a fuselage, or airframe 203, a landing gear 205, a tail member 207, a wing 209, drive systems 211 and 213, and battery compartments 235a and 235b. The airframe supports the fuselage 203 and, at least in part, defines the battery compartments 235a and 235b. The drive systems 211 and 213 are coupled to the airframe and, during operating, transmit vibrations to the airframe. The battery compartments 235a and 235b houses one or more batteries which can supply power to the drive systems 211 and 213. Each drive system 211 and 213 includes a fixed engine 237 and fixed engine 239, respectively, and a proprotor 215 and 217, respectively. Each of the proprotors 215 and 217 is rotatable and has a plurality of rotor blades 219 and 221, respectively, associated therewith. The position of proprotors 215 and 217, as well as the pitch of rotor blades 219 and 221, can be selectively controlled in order to selectively control direction, thrust, and lift of the tiltrotor aircraft 200.

FIG. 2A illustrates the tiltrotor aircraft 200 in helicopter mode, in which proprotors 215 and 217 are positioned substantially vertical to provide a lifting thrust. FIG. 2B illustrates tiltrotor aircraft 200 in an airplane mode in which proprotors 215 and 217 are positioned substantially horizontal to provide a forward thrust in which a lifting force is supplied by wing 209. It should be appreciated that tiltrotor aircraft can be operated such that proprotors 215 and 217 are selectively positioned between airplane mode and helicopter mode, which can be referred to as a conversion mode.

The drive system 213 is substantially symmetric to the drive system 211. Only for the sake of brevity, certain features will be disclosed only with regard to drive system 211. However, one of ordinary skill in the art will fully appreciate an understanding of the drive system 213 based upon the disclosure herein of the drive system 211.

Further, drive systems 211 and 213 are illustrated in the context of tiltrotor aircraft 200; however, drive systems 211 and 213 can be implemented on other tiltrotor aircraft. For example, FIGS. 3A and 3B can illustrate a tiltrotor. In other embodiments, the drive systems 211 and 213 can be used with an unmanned version of tiltrotor aircraft 200. Further, drive systems 211 and 213 can be integrated into a variety of tiltrotor aircraft configurations. Additionally, other drive systems are contemplated. For example, in some embodiments a gearbox arrangement provides torque to a rotor system of a helicopter.

Figure 3A:
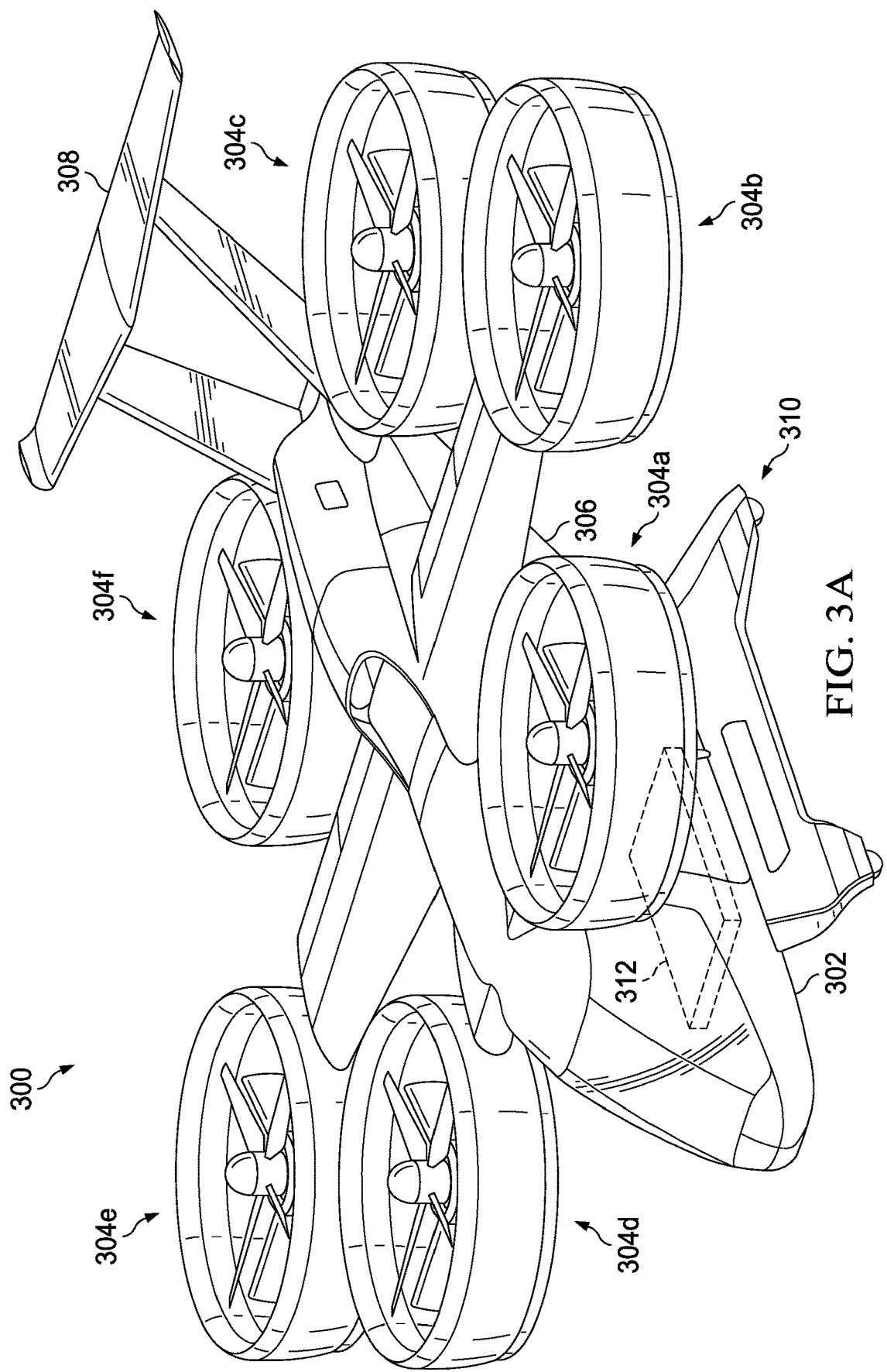
Figure 3B:
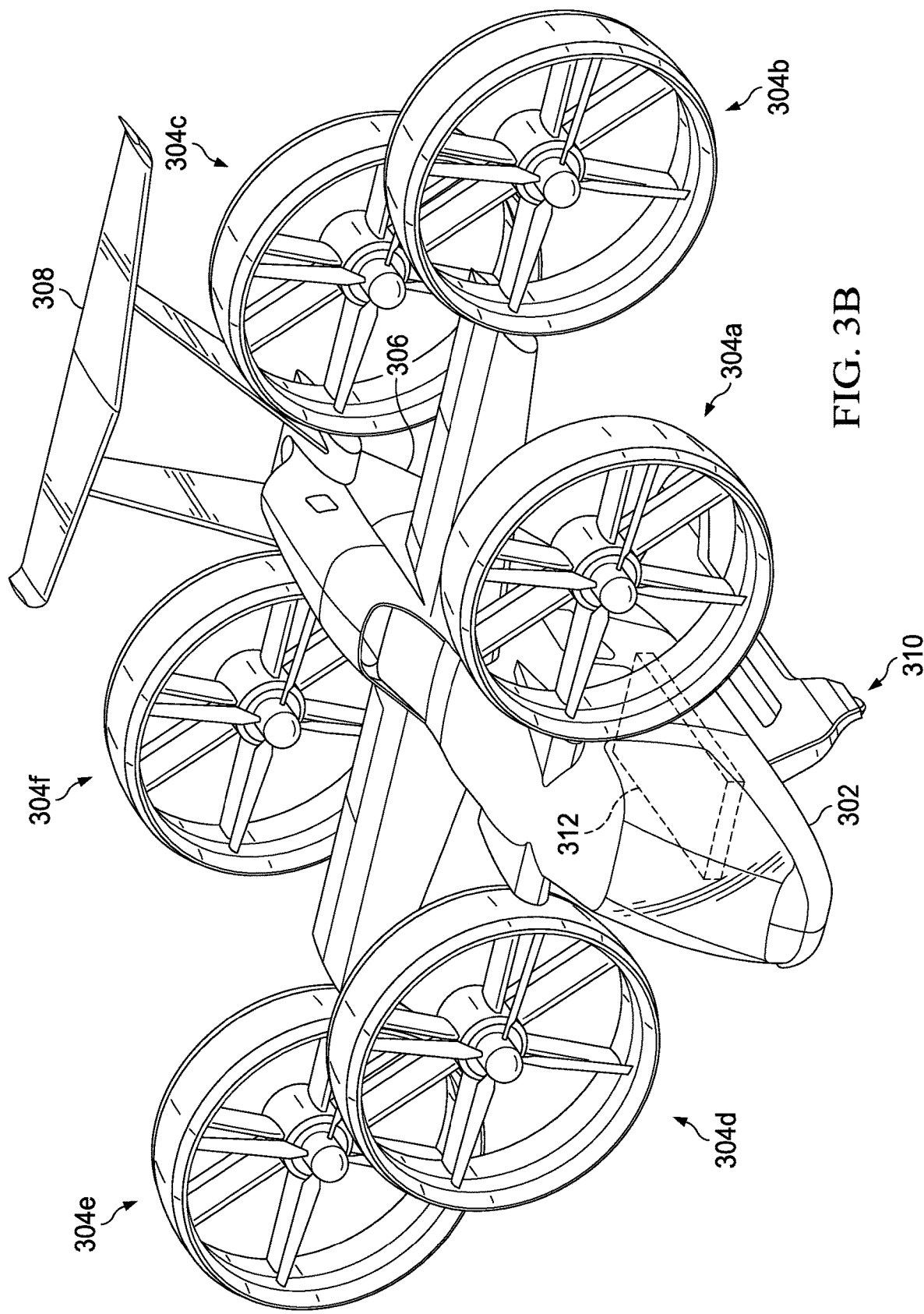

FIGS. 3A and 3B illustrate another exemplary aircraft, which in this case is an electric ducted tiltfan aircraft 300. The tiltfan aircraft 300 includes a fuselage airframe 302, a landing gear 310, empennage 306, a tail member 308, fan systems 304a, 304b, 304c, 304d, 304e, and 304f, and a battery compartment 312. The airframe 302 supports and, at least in part, defines the battery compartment 312. The fan systems 304a, 304b, 304c, 304d, 304e, and 304f are coupled to the airframe and, during operating, transmit vibrations to the airframe. The battery compartment 312 houses one or more batteries such as electric-vehicle batteries or others which can supply power to the fan systems 304a, 304b, 304c, 304d, 304e, and 304f. Each of fan systems 304a, 304b, 304c, 304d, 304e, and 304f is a hybrid electric system that may include both an internal combustion engine and an electric motor. Each of the fan systems 304a, 304b, 304c, 304d, 304e, and 304f includes a plurality of rotating blades. The position of the fan systems 304a, 304b, 304c, 304d, 304e, and 304f as well as the pitch of the blades can be selectively controlled in order to selectively control direction, thrust, and lift of the tiltfan aircraft 200.

FIG. 3A illustrates the tiltfan aircraft 300 in helicopter mode, in which the fan systems 304a, 304b, 304c, 304d, 304e, and 304f are positioned substantially vertical to provide a lifting thrust. FIG. 3B illustrates tiltfan aircraft 300 in an airplane mode in which the fan systems 304a, 304b, 304c, 304d, 304e, and 304f are positioned substantially horizontal to provide a forward thrust in which a lifting force is supplied by a wing. It should be appreciated that tiltfan aircraft can be operated such that fan systems 304a, 304b, 304c, 304d, 304e, and 304f are selectively positioned between airplane mode and helicopter mode, which can be referred to as a conversion mode.

It should be appreciated that the rotorcraft 100 of FIGS. 1A and 1B, the tiltrotor aircraft 200 of FIGS. 2A and 2B, and the tiltfan aircraft 300 of the FIGS. 3A and 3B are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Propulsion systems (e.g., rotor system 103 on the rotorcraft 101, rotor systems 211a and 211b of the tiltrotor aircraft 201, and fan systems 304a, 304b, 304c, 304d, 304e, and 304f on the tiltfan aircraft 300) are a major source of vibrations affecting an aircraft. The engines and transmission apply a torque to the propulsion system to rotate rotor blades and/or fan blades at a rotational frequency of "$\Omega$". During operation, when all the blades of the propulsion system are rotating, the blades collectively cause structures supporting the blades to vibrate. For example, such structures subjected to vibrations can include, but are not limited to a mast supporting the blades, an airframe to which the mast is attached, an empennage or a tail boom attached to the airframe, a wing supporting the propulsion system, and the like. The frequency of such vibrations is sometimes referred to as N per revolution and is commonly abbreviated and referred to herein as "N-per-rev." N-per-rev is a function of, among other things, the number of blades, "N", in the propulsion system, i.e., assuming identical blades are equally spaced around a hub and moving at a constant rotational velocity. N-per-rev is a frequency that is an integer multiple of the rotational frequency, $\Omega$, of the propulsion system, where the integer is the number of blades in the system. For example, a propulsion system operating at a rotational frequency of 5 Hz and comprising 3 blades has an N-per-rev equal to 3*5 Hz or 15 Hz. Likewise, a propulsion system operating at the same rotational frequency and comprising 5 blades has an N-per-rev equal to 5*5 Hz or about 25 Hz. The operational (i.e., rotational) frequency, $\Omega$, is also referred to as 1-per-rev. Any structural aircraft component that has a natural frequency approximately equal to n-per-rev is likely to resonate during operation of the aircraft, which could cause undesirable effects, even to catastrophic failure of the component. Therefore, it is desirable for aircraft structural natural frequencies well removed either above or below n-per-rev.

For dynamic systems in general, a resonant condition is undesirable and potentially destructive, and should be avoided. This can be accomplished by controlling the driving frequency f and/or a natural frequency $f_n$, or by incorporating sufficient damping. For some systems, such as helicopters, the driving frequency f remains almost constant, i.e., rotor at constant RPM, and sufficient damping is hard to implement without excessive weight. As a result, avoiding resonance requires controlling the system's natural frequency $f_n$, so that sufficient frequency margin is maintained between the natural frequency $f_n$ and the driving frequency f. This can be done by either changing the mass or the stiffness properties of the system.

Aircraft, such as rotorcraft, tiltrotors, and/or tiltfan aircraft, have multiple mass and stiffness elements, such as airframes and structural members, and multiple driving frequencies from the vibrating rotor combined with the mass and stiffness distributed throughout the airframe. These complexities can be simplified by reducing the multiple masses and stiffness elements, and driving frequencies to a total overall stiffness, mass, and damping of the aircraft, e.g., as is illustrated in FIGS. 4A and 4B.

Figure 4A:
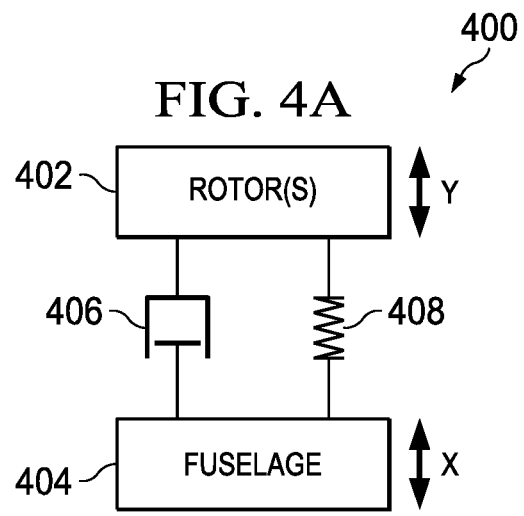
FIG. 4A illustrates a simplified diagram of an aircraft dynamic system, in accordance with some embodiments of the present disclosure.
Figure 4B:
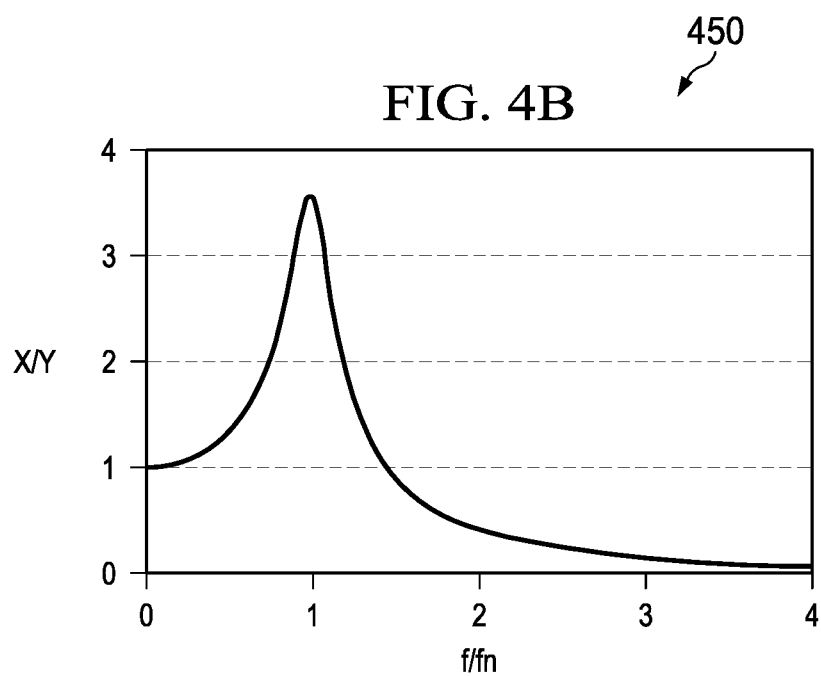
FIG. 4B illustrates a frequency response of the aircraft dynamic system of FIG. 4A, in accordance with some embodiments of the present disclosure.

FIG. 4A illustrates a simplified diagram of an aircraft dynamic system 400. The aircraft dynamic system 400 includes rotors 402, which is supported by a spring 408 and a damper 406 attached to a fuselage 404. The rotors 402 produce a vibratory force, which causes a motion Y of the rotors 402. The rotors 402 exert the vibratory force on the fuselage 404 and/or impart a portion of their motion Y to fuselage 404, which causes a relative motion X of fuselage 404 with respect to the motion Y of rotors 402. The frequency response of the aircraft dynamic system 400 is shown in a plot 450 of FIG. 4B. As shown in the far right of plot 450, the relative motion X of fuselage 404 with respect to the motion Y of rotors 402 becomes small when the excitation frequency f from rotors 402 is significantly greater than the natural frequency $f_n$, that is, the frequency ratio f/fn is significantly greater than 1.0 (resonance). In this system, the softer the spring 408, the lower the natural frequency $f_n$, therefore the greater the frequency ratio f/fn and corresponding motion X of fuselage 404.

One challenge associated with the aircraft dynamic system 400 is that the system is in resonance when $f/f_n$ is equal to one which, in this example, leads to the a 3.5× amplification of the motion Y of the rotors 402. Such motion could damage the aircraft. One potential solution is to add a tuned mass absorber to the system. As an example, the FIG. 5A illustrates a simplified diagram of an aircraft dynamic system 500 with tuned masses. The aircraft dynamic system 500 includes rotors 402, which are supported by a spring 408 and a damper 406 attached to a fuselage 404. The description of these components is provided with respect to FIG. 4A and is not repeated here only for the sake of brevity. In addition, the aircraft dynamic system 500 includes a vibration attenuation system 502. The vibration attenuation system 502 includes masses $M_1$ through $M_n$, which are supported by springs $506_1$ through $506_n$. Each of the springs $506_1$ through $506_n$ has a stiffness $k_1$ through $k_n$, respectively. In general, the number n may be any positive, non-negative integer. As the aircraft dynamic system 500 vibrates, the masses $M_1$ through $M_n$ oscillate based on the respective stiffnesses of the supporting springs $506_1$ through $506_n$, which can attenuate the frequency response of aircraft dynamic system 500. The frequency response of aircraft dynamic system 500 is shown in a plot 550 of FIG. 5B. As the plot 550 shows, the frequency response is attenuated in a threshold range, t, of the resonant frequency. Some traditional systems attempt to achieve such attenuation by adding a "dead" weight such as a block of material that servers little or no purpose except to add mass to the system. Such weights can be parasitic and can introduce other challenges such as increasing a baseline payload of the aircraft, which can take capacity that may be used for other, more critical payloads.

A solution to the above-identified challenges (and others) disclosed herein includes utilizing batteries to attenuate vibrations in electric and/or hybrid electric aircraft. The batteries in hybrid electric vehicles can sometimes weigh more than 50 lb. and may be utilized as a mass in a vibration attenuation system including one or more elastic devices coupled to the batteries and an airframe of the aircraft. Advantageously, the combination of the stiffness of the elastic devices and the mass of the batteries can attenuate a vibratory force and/or a vibratory displacement based on the batteries oscillating in response the vibratory force and/or the vibratory displacement. Moreover, because vibration attenuation systems of the present disclosure lack dead weights, the payload of the aircraft can remain largely unaffected by the inclusion of such a vibration attenuation system.

An elastic device is inclusive of a device that, when loaded, can elastically deform to store mechanical energy. For example, an elastic device may include one or more of a mechanical spring, a coil spring, an elastomeric spring, a gas spring, and a variable stiffness spring, a machined spring, an extension spring, a compressive spring, a shear spring, and/or any combination thereof.

A battery may include a plurality of cells, which may be grouped in pouches or packages. A battery may be used as a primary power source for propelling a vehicle such as aircraft. In some examples, a battery of the present disclosure includes a battery management system comprising a housing, monitoring equipment and cooling equipment for monitoring the battery and managing an operating temperature of the battery. For example, a battery may include one or more of a traction battery, an electric-vehicle battery, a secondary cell battery, a Lithium-ion, Lithium polymer battery, and/or any subsets or combinations thereof.

Figure 6:
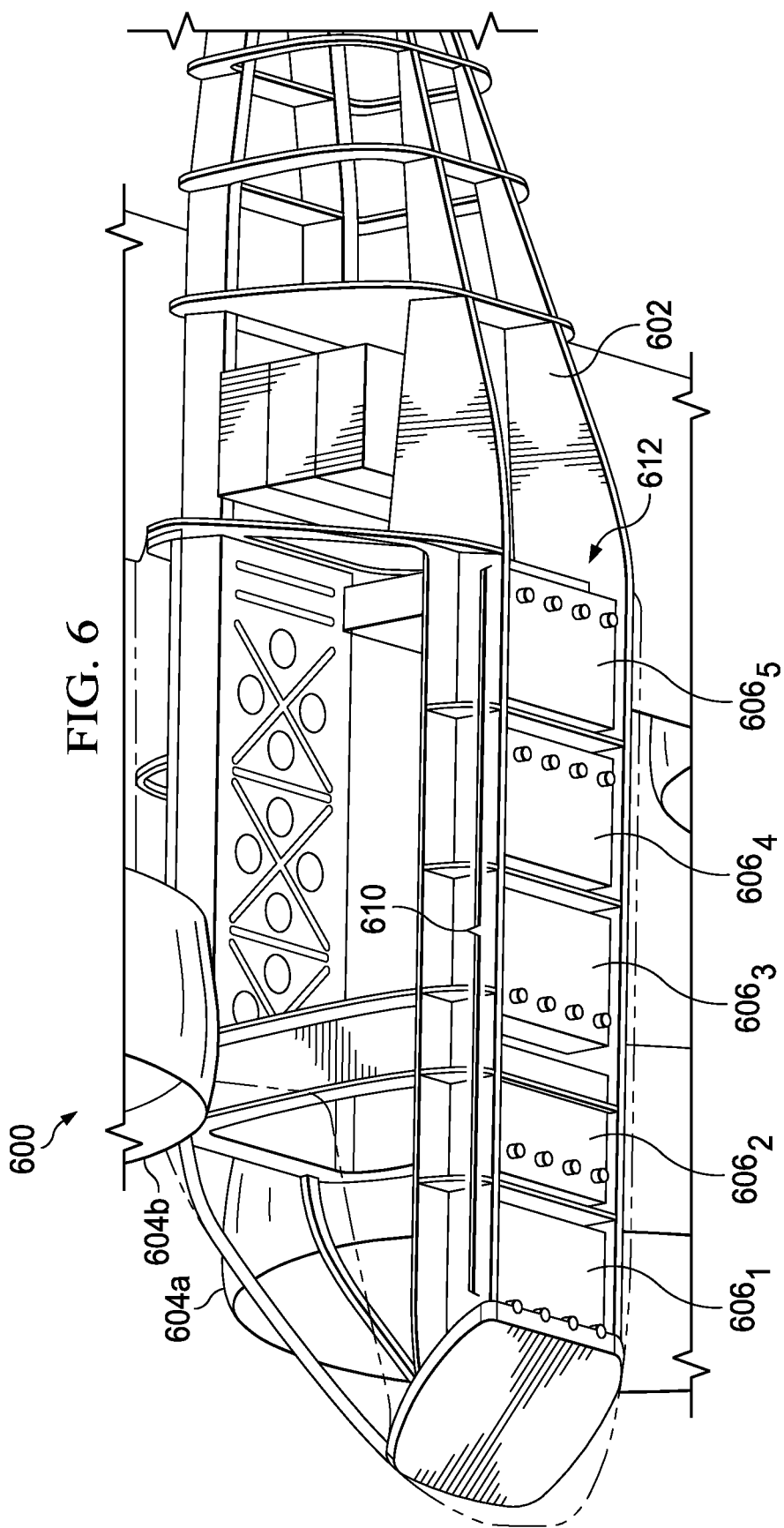
FIGS. 6, 7, 8, 9, 10, 11, and 12 illustrate details of various vibration attenuation systems, in accordance with some embodiments of the present disclosure.

FIG. 6 illustrates an aircraft 600, which includes a vibration attenuation system 610. The fuselage of the aircraft 600 is illustrated to show the airframe 602. The airframe 602 includes a compartment 612. The aircraft 600 includes rotor systems 604a and 604b, which are coupled to the airframe 602. During operation, the rotor systems 604a and 604b exert a vibratory force on the airframe 602. The vibration attenuation system 610 includes batteries $606_1$, $606_2$, $606_3$, $606_4$, and $606_5$ (referred to collective as the batteries 606) and elastic devices (FIG. 7 or 8) coupled to the batteries 606 and the airframe 602. Each of the batteries 606 has a corresponding mass (e.g., $M_1$, $M_2$, $M_3$, $M_4$, and, $M_5$). The vibration attenuation system 610 is located in the compartment 612.

Figure 7:
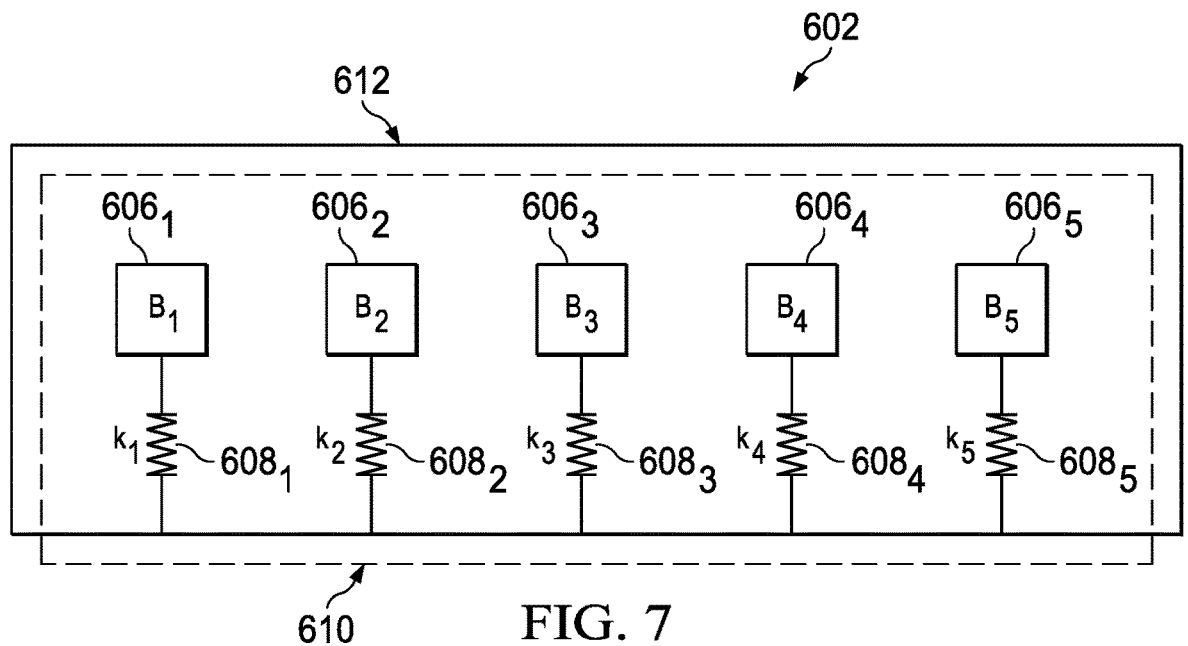
Figure 8:
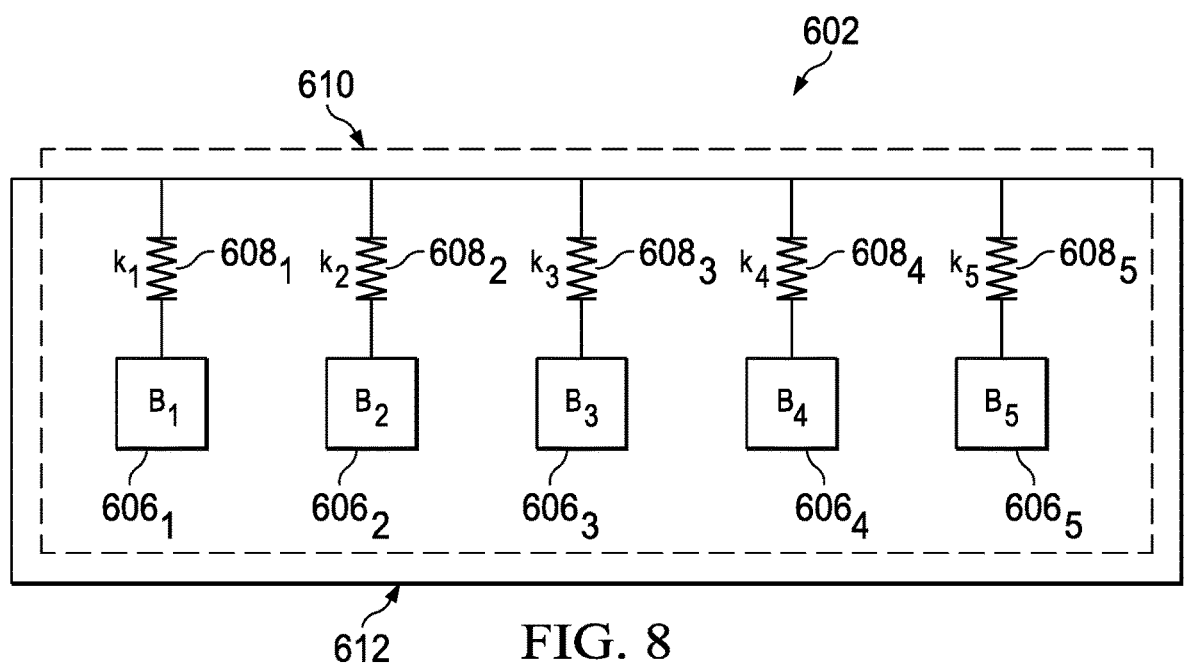

FIGS. 7 and 8 are simplified diagrams of the vibration attenuation system 610 coupled to the airframe 602 onboard the aircraft 600. The vibration attenuation system 610 includes batteries 606 each of which is coupled to a corresponding elastic device (i.e., elastic devices $608_1$, $608_2$, $608_3$, $608_4$, and $608_5$). Each of the elastic devices $608_1$, $608_2$, $608_3$, $608_4$, and $608_5$ (referred to collective as the elastic devices 608) is coupled to the compartment 612 of the airframe 602. The elastic devices 608 have stiffness k₁, k₂, k₃, k₄, and k₅, respectively. FIG. 7 illustrates a bottom of the batteries 606 coupled to the airframe 602 by the elastic devices 608. The elastic devices 608 support the batteries 606 at a bottom of the compartment 612. FIG. 8 illustrates a top of the batteries 606 coupled to the airframe by the elastic devices 608. The elastic devices 608 suspend the batteries 606 from a top of the compartment 612. Some embodiments may combine the bottom mounted and top mounted elastic devices of the FIGS. 7 and 8. Moreover, in some embodiments, the elastic devices 608 can support side surfaces of the batteries or any combination heretofore mentioned. Vibration attenuation systems of the present disclosure provide substantial flexibility with respect to the placement of the elastic devices 608 relative to the batteries 606. As the airframe 602 vibrates, the batteries 606 oscillate based, at least in part, on the respective stiffness of the elastic devices, which attenuate the frequency response of aircraft 600. The frequency response of the aircraft 600 can be attenuated regardless of the placement of the elastic devices, provided that the elastic devices can provide a requisite level of stiffness. The following Figures illustrate further details of elastic devices of the present disclosure.

Figure 9:
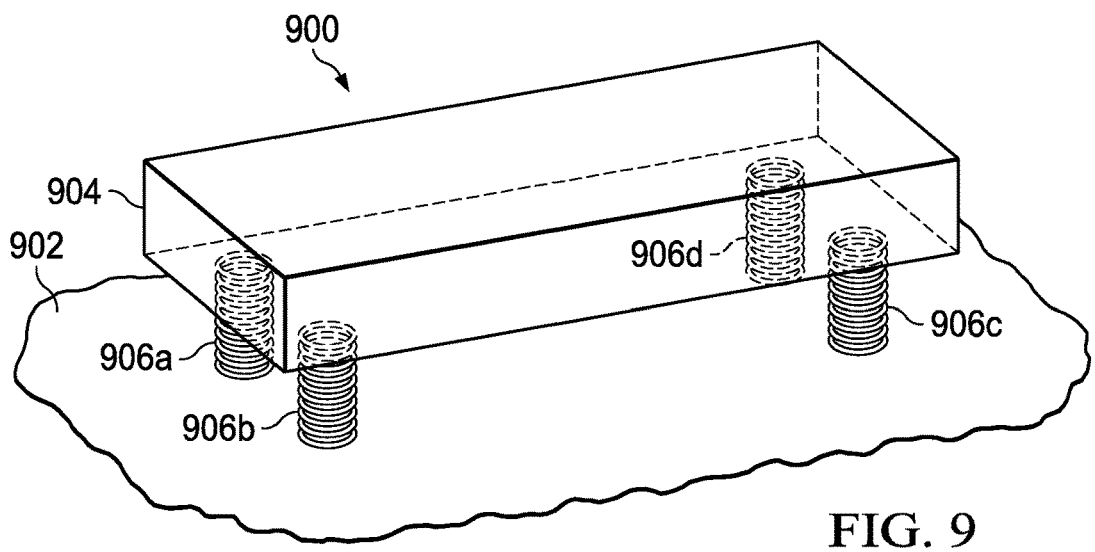

FIG. 9 illustrates a vibration attenuation system 900, which includes a battery 904 attached to an airframe 902 via elastic devices, which in this case includes mechanical springs 906a, 906b, 906c, and 906d. The airframe 902 may vibrate at a frequency based on a vibratory force. The mechanical springs 906a, 906b, 906c, and 906d are configured to attenuate vibrations at the frequency based on facilitating oscillation of the battery 904.

Figure 10:
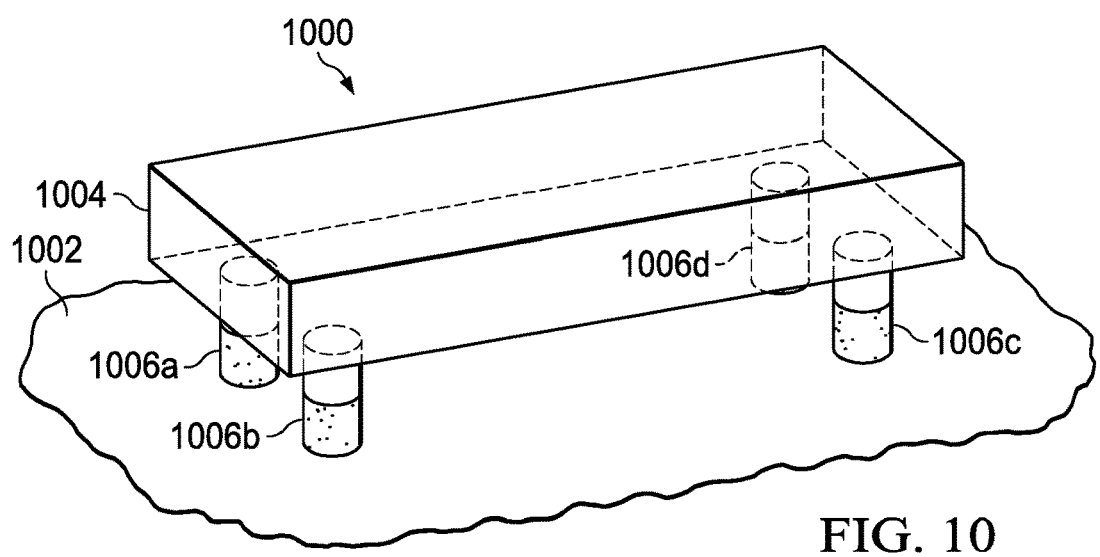

FIG. 10 illustrates a vibration attenuation system 1000, which includes a battery 1004 attached to an airframe 1002 via elastic devices, which in this case includes variable stiffness springs 1006a, 1006b, 1006c, and 1006d. The airframe 1002 may vibrate at a frequency based on a vibratory force. The variable stiffness springs 1006a, 1006b, 1006c, and 1006d are configured to attenuate vibrations at the frequency based on facilitating oscillation of the battery 904. The variable stiffness springs 1006a, 1006b, 1006c, and 1006d may process data from one or more sensors such as accelerometers or displacement gauges attached to the airframe 1002 and/or to the battery 1004 to monitor the vibrations and actively adjust a stiffness of one or more of the variable stiffness springs 1006a, 1006b, 1006c, and 1006d. In some examples, the variable stiffness springs may include gas (pneumatic) springs and the like.

Figure 11:
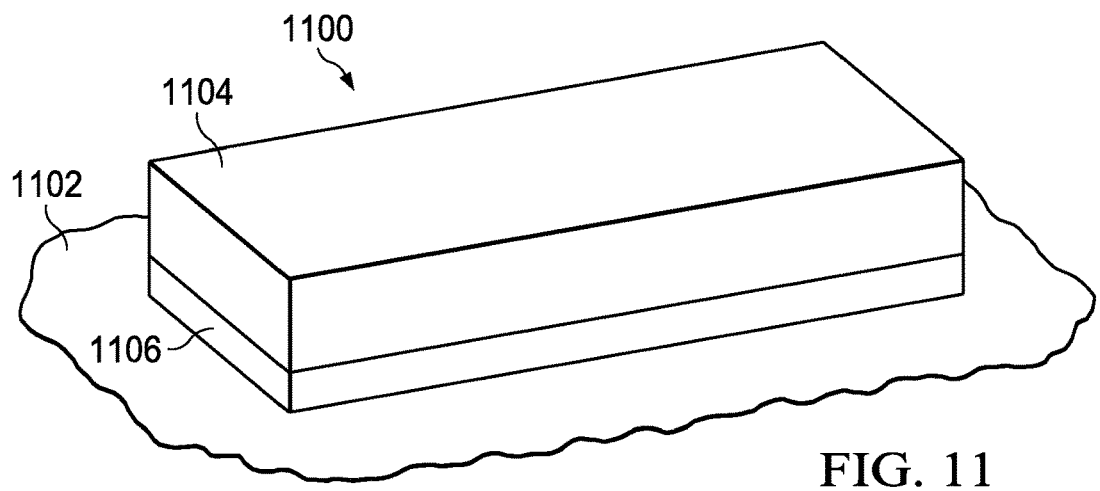

FIG. 11 illustrates a vibration attenuation system 1100, which includes a battery 1104 attached to an airframe 1102 via an elastic device, which in this case includes an elastomeric pad 1106. The airframe 1102 may vibrate at a frequency based on a vibratory force. The elastomeric pad 1106 need not be continuous or equal to the full dimensional size of the battery and is configured to attenuate vibrations at the frequency based on facilitating oscillation of the battery 1104.

The stiffness of an elastic device and/or the mass of a battery can be "tuned" to attenuate one or more specific frequencies such as the modal frequency corresponding to a normal mode of an airframe of an aircraft or a frequency associated with a rotor system such a N-per-rev. Each normal mode has a corresponding modal frequency at which the normal mode occurs. In some examples, the elastic devices are configured with a stiffness that causes the batteries to oscillate at a frequency that attenuates vibrations within a threshold range of a target frequency, such as a modal frequency of the airframe and/or N-per-rev. The stiffness and mass may be tuned to attenuation a target frequency using the following equation:

$$k_v = (2\pi * \text{target frequency, in Hz})^2 (\text{Mass}) \quad \text{EQ 1}$$

It is noted that the target frequency is the frequency in which the vibrations are to be attenuated. It is also noted that while some Figures of the present disclosure illustrate a single elastic device and a single stiffness value for each battery, several elastic devices may be used on each battery. Collectively, the elastic devices must provide the stiffness value. For example, for a given stiffness value $k_v$, if a battery is supported by multiple elastic devices, then the stiffness value $k_v$ is divided by the number of elastic devices to determine the requisite stiffness of each elastic device. For example, the stiffness of each elastic device $k_i$ would be $k_i = k_v / n$ where n is the number of stiffness devices.

Figure 12:
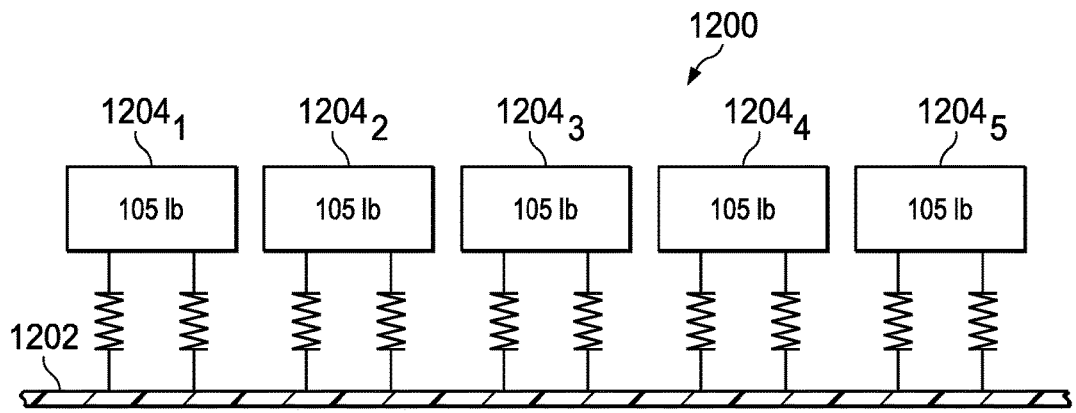

FIG. 12 illustrates a vibration attenuation system 1200, which includes a batteries $1204_1$, $1204_2$, $1204_3$, $1204_4$, and $1204_5$ (referred to collective as the batteries 1204) attached to an airframe 1202 by elastic devices. In this example, each of the batteries has a weight of 105 lb. Thus, we can use the equation EQ 1 to derive a tuned stiffness based on the mass of each battery for a target frequency, $f_o$, e.g., 75 Hz, which in this case is an operating frequency of an aircraft on which the system 1200 is deployed.

$$k_v = (2\pi * 75 \text{ Hz})^2 \left( \frac{105 \text{ lbs}}{386^{in}/s^2/g} \right) = 60{,}407 \frac{\text{lb}}{\text{in}}$$

Figure 13:
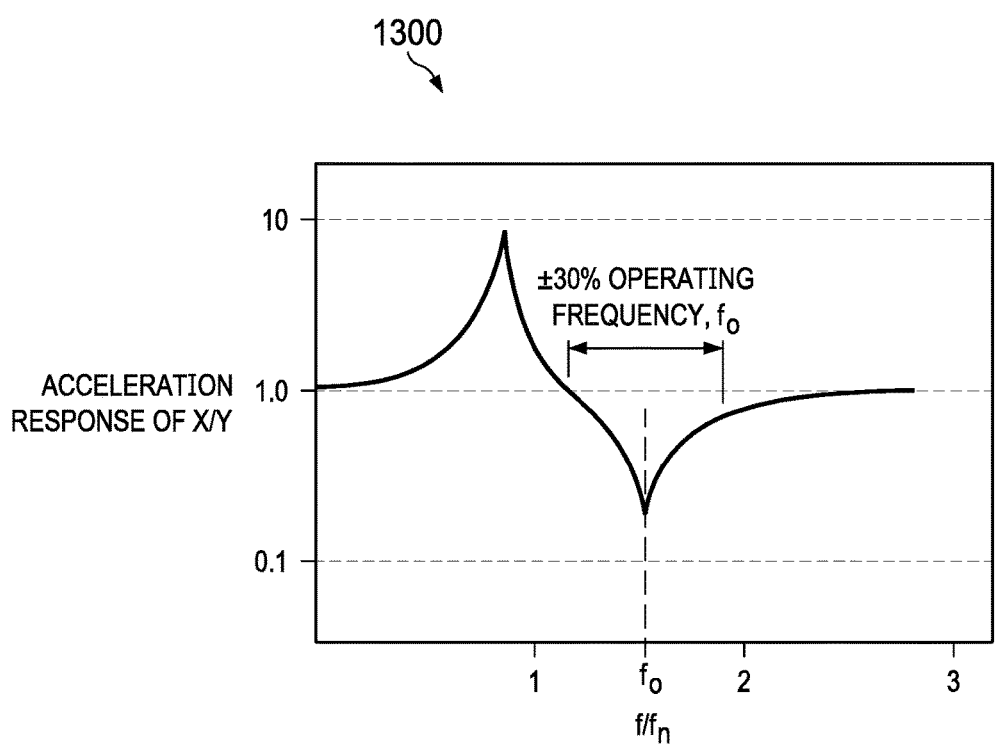
FIG. 13 illustrates a frequency response of an aircraft, in accordance with some embodiments of the present disclosure

Though only two elastic devices per battery are visible in the viewpoint shown in FIG. 12, each of the batteries 1204 is attached to the airframe by four elastic devices (e.g., as illustrated in FIGS. 9 and/or 10). Thus, in this example, each of the four elastic devices provides a stiffness of about 15,101.8 lb/in supporting the battery on four springs, each having a stiffness of about 15,101.8 lb/in would provide a total stiffness of about 60,407 lb/in and is tuned to attenuate vibrations at target frequency of 75 Hz. FIG. 13 illustrates a frequency response of system 1200. The plot shows that the frequency response is attenuated in a threshold range or ±30% of the operating frequency $f_o$ of the airframe 1202. The stiffness of the elastic devices is tuned to cause the mass of the batteries to oscillate at a frequency, which attenuates the vibrations within ±30% of the first operating frequency $f_o$. Depending on a vibration mode shape at a target frequency, spatial distribution of the batteries could be varied to optimize positioning of the batteries at modal node points.

Figure 14A:
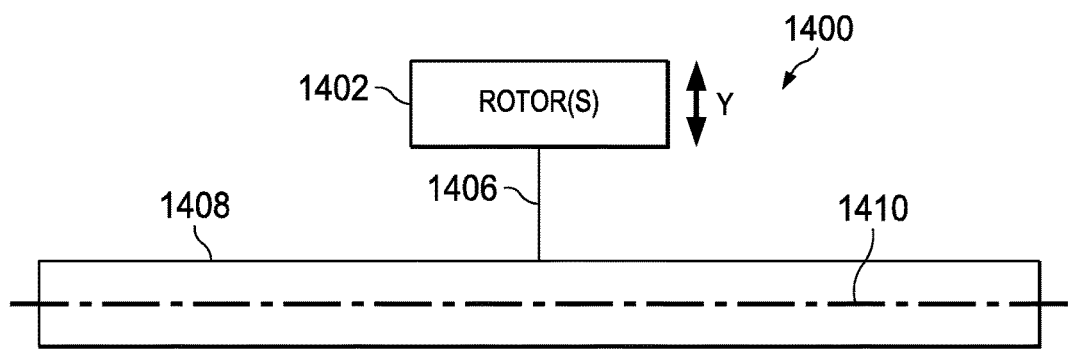
FIGS. 14A, 14B, 14C, 14D, 15A, 15B, 15C, and 15D illustrate diagrams corresponding to placement of batteries based on normal modes, in accordance with some embodiments of the present disclosure.
Figure 14B:
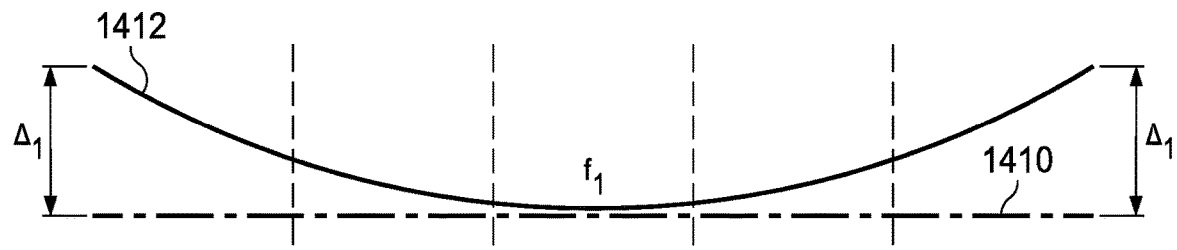
Figure 14C:
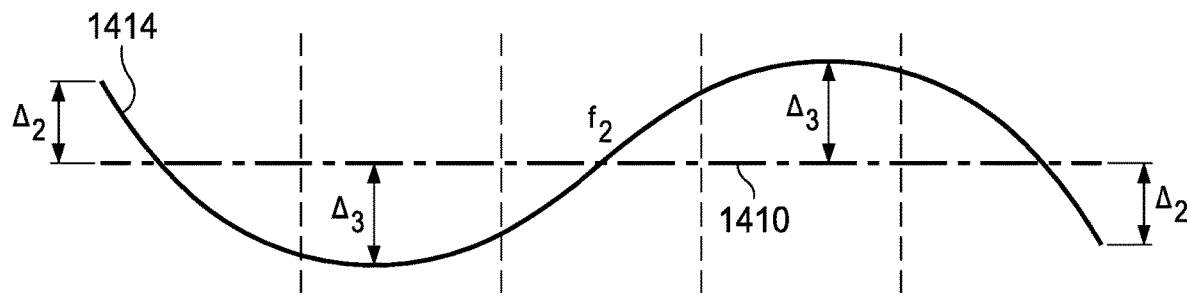
Figure 14D:
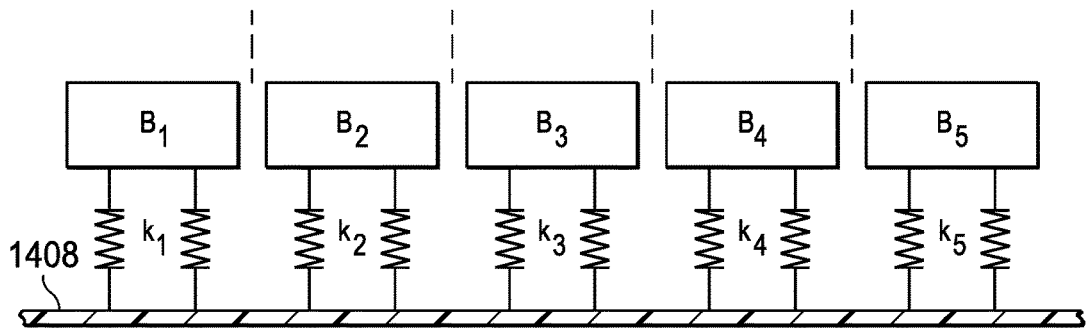

FIGS. 14A, 14B, 14C, and 14D illustrate corresponding diagrams of an aircraft 1400, which includes a fuselage 1408 coupled to rotors 1402 by a mast 1406. FIG. 14D illustrates elastic devices coupling batteries $B_1$, $B_2$, $B_3$, $B_4$, and $B_5$, to the fuselage 1408. In the FIG. 14A, the fuselage 1408 is simplified as a simple beam, which has a stiffness that accounts for all of the stiffnesses of the actual airframe. 1410 represents a centerline, or neutral axis, of the beam. The rotors 1402 exert a vibratory force on the fuselage 1408 via the mast 1406 and/or impart a portion of their motion Y to fuselage 1408, which causes the fuselage 1408 to oscillate. The FIGS. 14B and 14C illustrate example normal modes of oscillation of the fuselage 1408. FIG. 14B illustrates a normal mode 1412 relative to the undeformed centerline 1410. The frequency $f_1$ is the frequency at which the normal mode 1412 occurs in the fuselage 1408. In the normal mode 1412, maximum vibratory displacements $\Delta_1$ occur at the extreme ends of the fuselage 1408. In some examples, a battery that is supported at a location along a length of the fuselage 1408 corresponding to the maximum vibratory displacement $\Delta_1$ such as batteries $B_1$ and $B_5$ are advantageously tuned to the frequency $f_1$. In other words, the elastic devices supporting each of the batteries $B_1$ and $B_5$ may be tuned to attenuate the frequency $f_1$. Such a placement of frequency $f_1$, tuned batteries may maximize the attenuating effect of the batteries for the normal mode 1412 since the batteries are placed at antinode locations where they will experience, and can therefore attenuate, the maximum vibratory displacement $\Delta_1$. Similarly, the FIG. 14C illustrates a normal mode 1414 relative to the undeformed centerline 1410. The frequency $f_2$ is the frequency at which the normal mode 1414 occurs in the fuselage 1408. In the normal mode 1414, maximum vibratory displacements $\Delta_3$ occur approximately at ⅓ points of the length of the fuselage 1408 (i.e., assuming displacements $\Delta_3$>displacements $\Delta_2$). Thus, the batteries $B_2$ and $B_4$ can be advantageously tuned to the frequency $f_2$ since they corresponding to a maximum vibratory displacement of the normal mode 1414 of the fuselage 1408.

The stiffness of each of the elastic devices may or may not be the same. In some embodiments, two or more (or all) of the elastic devices have approximately the same stiffness. In other examples, two or more (or all) of the elastic devices have a stiffness different from all others of the elastic devices. For example, in the example of FIGS. 14A-D, the elastic devices supporting each of the batteries $B_1$ and $B_5$ have a stiffness tuned to the frequency $f_1$ while the elastic device supporting each of the batteries $B_2$ and $B_4$ have a stiffness tuned to the frequency $f_2$. In some examples, all of the elastic devices have a stiffness different from some others of the elastic devices. In addition, the stiffness of each elastic device may be constant or variable. For example, some elastic devices such a coil springs have an approximately constant stiffness. Other examples of elastic devices such a gas spring has a variable stiffness.

Figure 15A:
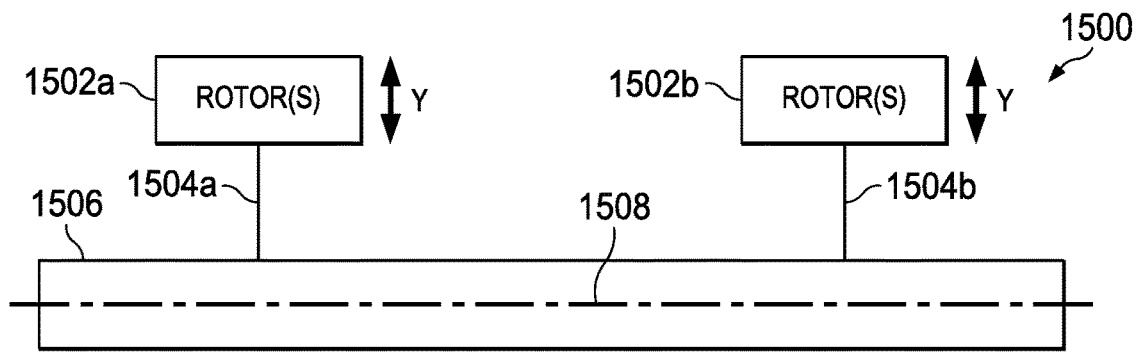
Figure 15B:
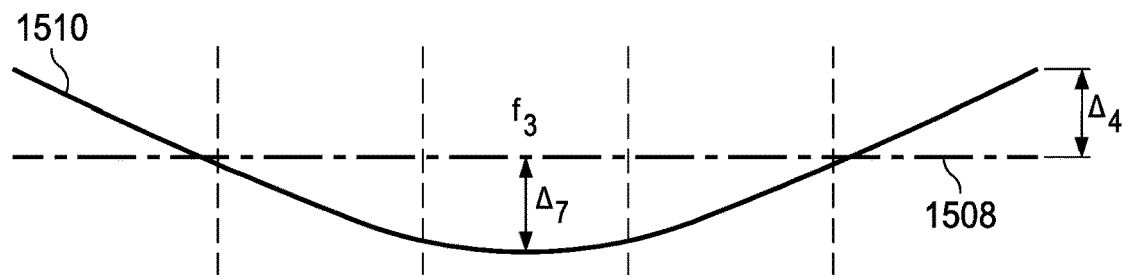
Figure 15C:
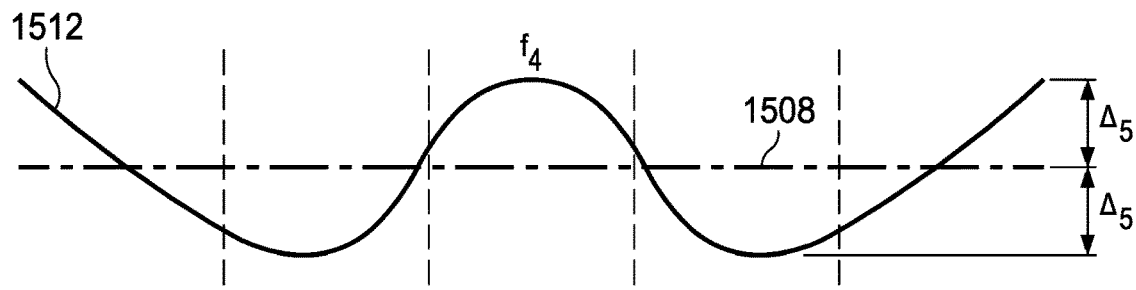
Figure 15D:
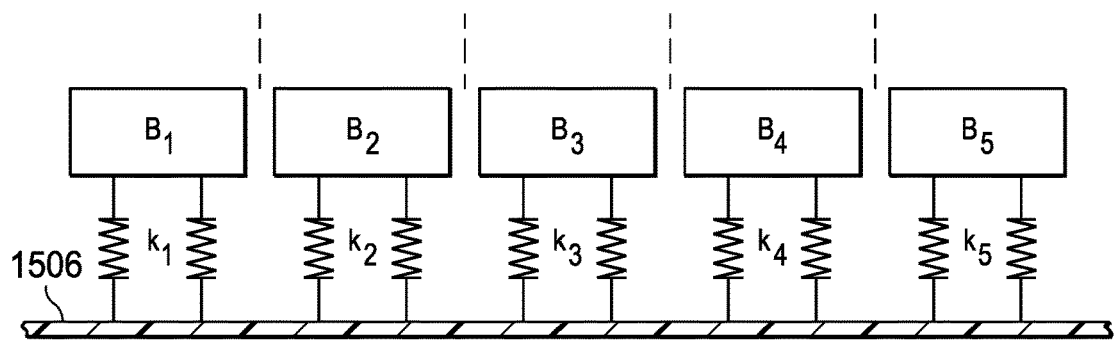

FIGS. 15A, 15B, 15C, and 15D illustrate corresponding diagrams of an aircraft 1500, which includes a fuselage 1506 coupled to rotors 1502a and 1502b by masts 1504a and 1504b, respectively. FIG. 15D illustrates elastic devices coupling batteries $B_1$, $B_2$, $B_3$, $B_4$, and $B_5$, to the fuselage 1506. In the FIG. 15A, the fuselage 1506 is simplified as a simple beam. 1508 represents a centerline, or neutral axis, of the beam. The rotors 1502a and 1502b exert a vibratory force on the fuselage 1506 via the masts 1504a and 1504b and/or impart a portion of their motion Y to fuselage 1506, which causes the fuselage 1506 to oscillate. The FIGS. 15B and 15C illustrate example normal modes of oscillations of the fuselage 1506. FIG. 15B illustrates a normal mode 1510 relative to the undeformed centerline 1508. The frequency $f_3$ is the frequency at which the normal mode 1510 occurs in the fuselage 1506. In the normal mode 1510, maximum vibratory displacements $\Delta_7$ occurs at a center of the fuselage 1506 (i.e., assuming displacements $\Delta_7$>displacements $\Delta_4$). Thus, the elastic device supporting the battery $B_3$ may be advantageously tuned to the frequency $f_3$ since it corresponds to the maximum vibratory displacement $\Delta_7$ of the normal mode 1510 of the fuselage 1506 and can readily attenuate the maximum vibratory displacement $\Delta_7$. Similarly, the FIG. 15C illustrates a normal mode 1512 relative to the undeformed centerline 1508. The frequency $f_4$ is the frequency at which the normal mode 1512 occurs in the fuselage 1506. In the normal mode 1512, local maximum vibratory displacements $\Delta_5$ occur at several points along the length of the fuselage 1506. Because all of the batteries $B_1$, $B_2$, $B_3$, $B_4$, and $B_5$ are near a local maximum (antinode), any and/or all of the batteries may be advantageously tuned to the frequency $f_4$ to attenuate the maximum vibratory displacement $\Delta_5$.

Figure 16:
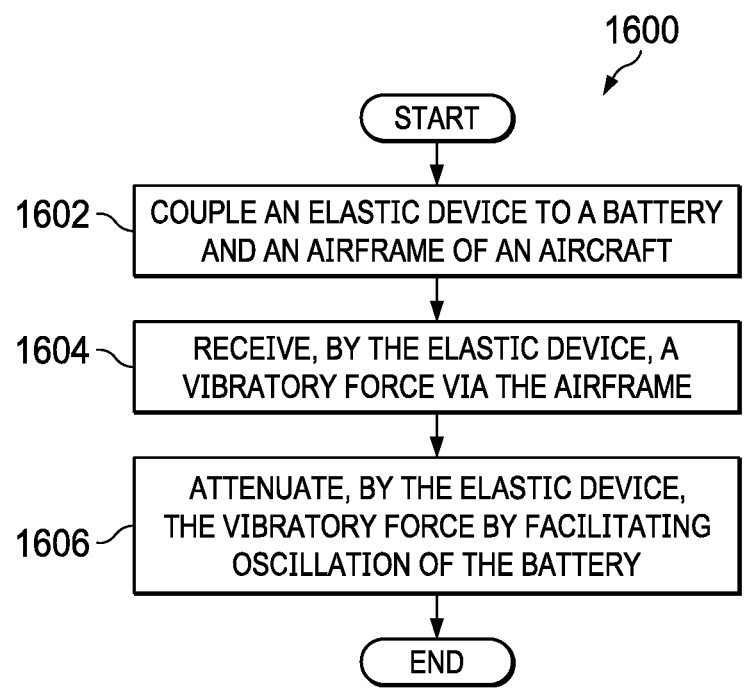
FIG. 16 illustrates a method, in accordance with some embodiments of the present disclosure.

FIG. 16 illustrates a method 1600 according to some embodiments of the present disclosure. The method 1600 may begin at 1602 by coupling an elastic device to two or more batteries and an airframe of an aircraft. At 1604, the elastic device receives a vibratory force and/or a vibratory displacement via the airframe. The method 1600 may terminate at 1604 by attenuating, by the elastic device, the vibratory force and/or the vibratory displacement by facilitating oscillation of the battery. In some embodiments, one or more portions of the method 1600 may repeat, e.g., in a loop.

Several embodiments of the present disclosure utilize a certain number of members, such as batteries, elastic devices, vibration attenuation system, rotor systems, and the like. However, embodiments of the present disclosure are not limited to the specific number of members in the illustrated embodiments. The number of members can vary between different embodiments. For example, some embodiments may be implemented using more, less, and/or other member than those illustrated in the Figures. Moreover, some embodiments may consolidate two or more of the members into a single member. In addition, several embodiments of the present disclosure refer to coupling and/or attachments. Such coupling and/or attachments are inclusive of screws, nuts, bolts, welds or any other mechanical fasteners for attaching two or more components to one another.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order. As another example, some embodiments of the present disclosure have been described with respect to inhibiting (and/or preventing) lubricant from passing between compartments within a drive system. However, it will be appreciated by those of skill in the art that embodiments of the present disclosure are not limited to lubricants and are equally applicable to any liquid that may be utilized in such a drive system. In addition, it will be appreciated by those of skill in the art that embodiments of the present disclosure are not limited to drive systems and are equally applicable to any system of an aircraft, or another vehicle, that relies on liquids for operation.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft comprising:
    an airframe;
    a rotor system coupled to the airframe, the rotor system being operable to exert a vibratory force on the airframe; and
    a vibration attenuation system comprising:
        first and second batteries to supply power to the rotor system;
        a first elastic device coupled between a first surface of the first battery and to the airframe; and
        a second elastic device coupled between a first surface of the second battery and the airframe;
    wherein each of the elastic devices is configured to attenuate the vibratory force based on facilitating oscillation of the one of the batteries to which the elastic device is coupled; and
    wherein the first elastic device has a stiffness tuned to a first frequency and the second elastic device has a stiffness tuned to a second frequency based on respective locations of the first and second batteries along a length of a fuselage of the aircraft.

2. The aircraft of claim 1, wherein:
    the first elastic device of the elastic devices supports the first battery at a location along a length of the airframe, the location corresponding to a local maximum displacement of a normal mode of the airframe.

3. The aircraft of claim 1, wherein each of the elastic devices is configured with a stiffness to facilitate the batteries oscillating at a particular frequency, wherein the particular frequency attenuates the vibratory force within a threshold range of a natural frequency of the airframe.

4. The aircraft of claim 3, wherein the threshold range comprises ±30% of the natural frequency of the airframe.

5. The aircraft of claim 1, wherein a stiffness of at least one of the elastic devices is constant.

6. The aircraft of claim 1, wherein a stiffness of at least one of the elastic devices is variable.

7. The aircraft of claim 1, wherein the elastic devices comprise one selected from the group consisting of: a mechanical spring, an elastomeric spring, a gas spring, and a variable stiffness spring.

8. The aircraft of claim 1, wherein each of the batteries comprises an electric-vehicle battery.

9. A vibration attenuation system comprising:
    first and second batteries to supply power to a rotor system of an aircraft; and
    a first elastic device coupled between a first surface of the first battery and to an airframe of the aircraft and a second elastic device coupled between a first surface of the second battery and the airframe of the aircraft, the elastic devices being configured to attenuate a vibratory force of the airframe based on facilitating oscillation of the more batteries, wherein the first elastic device has a stiffness tuned to a first frequency and the second elastic device has a stiffness tuned to a second frequency based on respective locations of the first and second batteries along a length of a fuselage of the aircraft.

10. The vibration attenuation system of claim 9, wherein each of the elastic devices is configured with a stiffness to facilitate the batteries oscillating at a particular frequency, wherein the particular frequency attenuates the vibratory force within a threshold range of a natural frequency of the airframe.

11. The vibration attenuation system of claim 10, wherein the threshold range comprises +/−30% of the natural frequency of the airframe.

12. The vibration attenuation system of claim 9, wherein the elastic devices comprise one selected from the group consisting of: a mechanical spring, an elastomeric spring, a gas spring, and an adjustable variable stiffness support.

13. The vibration attenuation system of claim 9, wherein each of the batteries comprises:
    a battery management system comprising a housing, wherein the battery management system is operable to monitor the battery and manage an operating temperature of the battery.

14. A method comprising:
    coupling a first elastic device to a first battery and an airframe of an aircraft;
    coupling a second elastic device to a second battery and the airframe of the aircraft;
    receiving, by the elastic devices, a vibratory force via the airframe; and
    attenuating, by the elastic devices, the vibratory force based on facilitating oscillation of the batteries, wherein the first elastic device has a stiffness tuned to a first frequency and the second elastic device has a stiffness tuned to a second frequency based on respective locations of the first and second batteries along a length of a fuselage of the aircraft.

15. The method of claim 14, further comprising:
    oscillating, by the batteries, at a particular frequency based on a stiffness of one or more of the elastic devices, wherein the particular frequency attenuates the vibratory force within a threshold range of a natural frequency of the airframe.

16. The method of claim 15, wherein the threshold range comprises +/−30% of the natural frequency of the airframe.

17. The method of claim 14, further comprising:
    suspending, by the elastic devices, the batteries from top surfaces of the batteries.

18. The method of claim 14, wherein supporting, by the elastic devices, the batteries at bottom surfaces of the batteries.

* * * * *